United States Patent [19]

Berry

[11] 4,133,306

[45] Jan. 9, 1979

[54] PALATAL EXERCISER CONTROL DEVICE

[76] Inventor: Robert A. Berry, 3323 Longhorn Rd., SW., Roanoke, Va. 24018

[21] Appl. No.: 757,448

[22] Filed: Jan. 6, 1977

[51] Int. Cl.$^2$ ............................................. A61H 7/00
[52] U.S. Cl. ....................................................... 128/64
[58] Field of Search ................. 128/1 R, 2 R, 2 S, 64, 128/325, 344; 3/1, 1.2

[56] References Cited

U.S. PATENT DOCUMENTS

| | | | |
|---|---|---|---|
| 3,049,125 | 8/1962 | Kriwkowitsch | 128/344 X |
| 3,137,292 | 6/1964 | Richter et al. | 128/2.05 A |
| 3,447,534 | 6/1969 | Lubit | 128/64 |
| 3,508,537 | 4/1970 | Kahn et al. | 128/2.05 A |
| 3,550,582 | 12/1970 | Wilhelmson | 128/2.05 A |
| 3,593,705 | 7/1971 | Thomas et al. | 128/2.06 A |
| 3,942,518 | 3/1976 | Tenteris et al. | 128/64 X |

Primary Examiner—William E. Kamm

[57] ABSTRACT

A semi-manually operated stimulus delivery mechanism incorporating various timing, measuring, counting and visual signal devices which control according to preset criteria, inflation and deflation of an air-filled oral exercise prosthesis.

3 Claims, 1 Drawing Figure

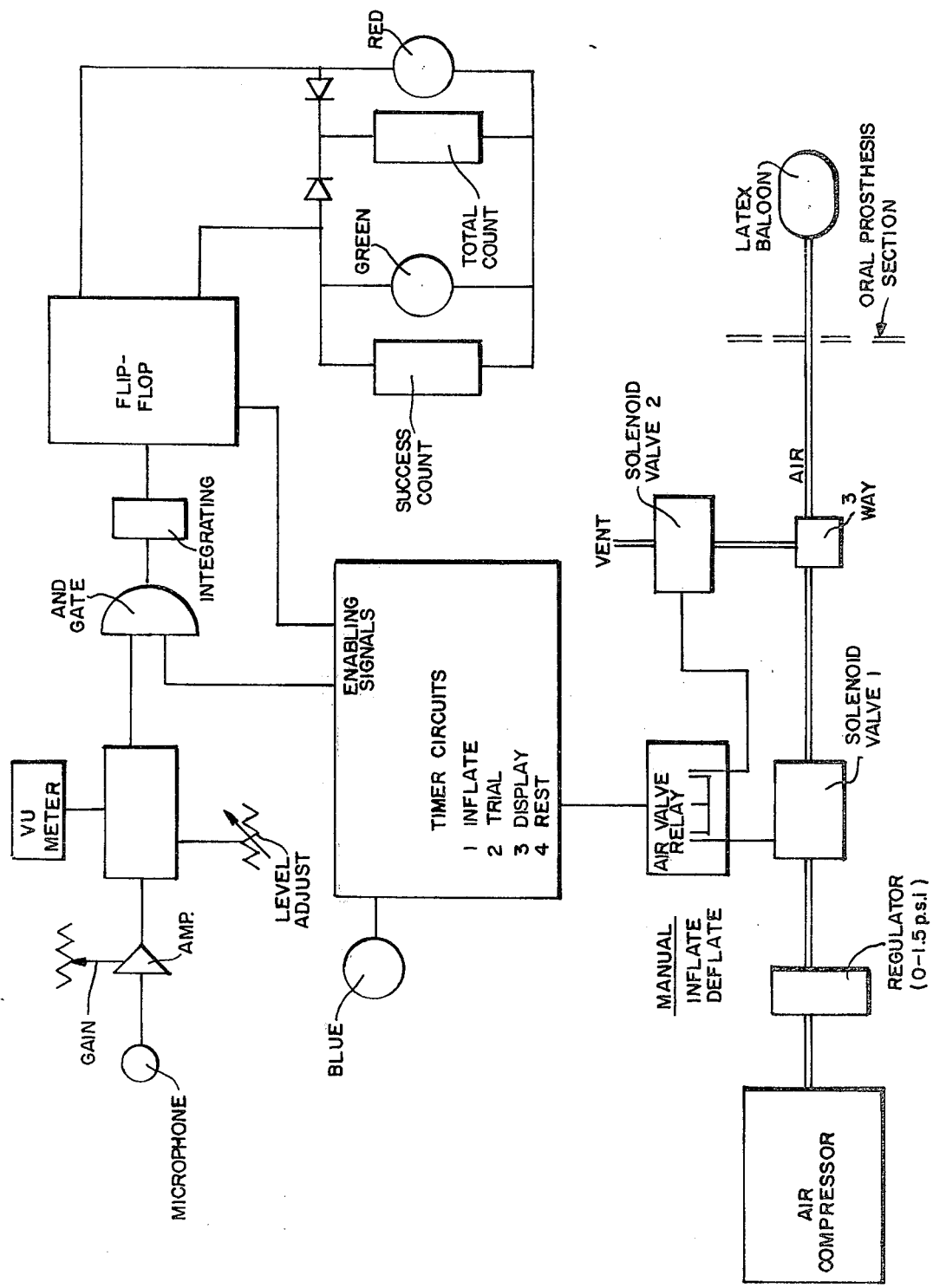

PALATAL EXERCISER CONTROL DEVICE

BACKGROUND OF THE INVENTION

Improvement of velopharyngeal closure (contact of the soft palate with the throat walls to prevent air escapage to the external environment through the nasal passages) and speech intelligibility by a palatal exercise consisting of pressure stimulation during a simultaneous phonatory act by the patient has been accomplished by the use of an inflatable oral prosthesis positioned opposite the soft palate. Reference is here made to U.S. Pat. No. 3,447,534 which sets forth in some great degree these concepts. The exercise, however, has been administered by hand squeezing a bulb operated by the patient, and leaves much to be desired in this type of treatment.

SUMMARY OF THE INVENTION

The present invention goes beyond the simple "hand held" version of the aforementioned patent by providing (1) the onset of inflation and deflation of the balloon portion of the prosthesis, (2) the interval between exercises, (3) regulation of the air flow for expansion of the inflatable portion of the prosthesis, (4) visual monitoring for a patient's self regulation of phonation, (5) automatic recording of the number of exercises initiated and the number of exercises completed according to present criteria and (6) signal feedback to the patient indicating his success or failure to phonate at an optimum level during the period of the exercise.

To date, there have been no effective means to control, manipulate or quantify systematically the length of exercise, period of rest, amount of pressure stimulation, predetermined level of phonation during stimulation, number of stimulations delivered and adequately performed exercises, and patient reinforcement involved. With the present invention the patient need to phonate only upon signal and is relieved of the heretofore subjective decisions of timing inflation and deflation, and rest interval periods as well as mechanical operation and coordination of handbulb etcetera. The individual patients have no way feasibly to estimate adequate ballon expansion since there is little, or no, feedback from the damaged neural fibers in the pharyngeal tissue of the oral cavity. The present invention may be used in the clinic, in the hospital ward, or in a home setting with only a minimum amount of training of non-professional personnel and/or family members to assist with occasional adjustments and monitoring of both patient and instrument.

BRIEF DESCRIPTION OF THE DRAWING

The drawing is a line diagram of an electropneumatic system for controlling the inflation of an oral prothesis such as a latex balloon from a source of compressed air, together with a regulating audio/visual compensating control under the command of a patient upon whom the prothesis is fitted, including timing, warning and counting circuits responsive to the patient's actions under testing with the prothesis.

DETAILED OPERATION (Reference is made to labels on the Drawing per se)

Prior to activating the power switch, the air-regulator valve should be fully closed. This precautionary step will prevent over-inflation of the balloon portion of the oral prothesis before an inflation adjustment is made. With the power switch activated, the air compressor begins operation and the invention will function in two modes: Manual or Automatic.

Manual Mode of Operation:

This mode allows the operator to adjust the expansion of the balloon (prosthesis). With the selector switch in the "Inflate" position, solenoid valve (S.V.)#1 opens while solenoid valve #2 is closed. The operator then slowly opens the air-regulator valve and compressed air flows through S.V. #1 and the 3-way connecter to the balloon which can be inflated to a desired amount. Next, the selector switch is moved to the "Deflate" position. S.V. #1 closes and S.V. #2 opens, venting the compressed air to the atmosphere, — deflating the balloon. The selector switch may then be moved to "Standby" (deflate continued) position prior to operation in the Automatic Mode.

DESCRIPTION OF DETAILED OPERATIONS

In order to better understand the operation of the invention an essential part of the operational components includes a number of independently adjustable timing circuits, these being conventional RC type circuits well known in the electrical arts, their parameters:

| CYCLE | FUNCTION | LIGHTS | PROTH-ESIS |
|---|---|---|---|
| #1 Inflate (0–15 sec.) | Inflate | None | Inflate |
| #2 Trial * (0–15 sec.) | Start/Stop | Blue light | Inflated |
| #3 Display (0–15 sec.) | Feedback/Score | Red & Total Counter or Green, Total & Success Counters | Deflate |
| #4 Rest (0–7.5 sec.) | None | None | Deflated |

* The voice level detector is enabled for an input greater than the selected level and then de-enabled at the end of the trial portion of the cycle.

Automatic Mode of Operation:

In this mode there are four (4) distinct, independently adjustable time periods. In sequential order they are: INFLATE! TRIAL! DISPLAY! and REST! The intervals can be adjusted as follows: INFLATE can be from 0 to 15 seconds; TRIAL can be from 0 to 15 seconds; DISPLAY can be from 0 to 15 seconds; and REST can be from 0 to 7.5 seconds. Preliminary preparations: The patient is fitted with a partially inflatable oral prosthesis, and then seated facing the device of the invention. The patient's head and lips are positioned approximately eighteen inches (18 inches) from the microphone input. (At this stage it is assumed that the patient has been trained to observe the VU meter needle indicator (voice level detector), counters, and different colored electric lights (see drawing for colors identification) which mark initiation or cessation of his phonatory response, and provide visual feedback of his success or failure to perform each phonatory act in his individual program).

CONTINUING (Automatic Mode of Operation):

With the selector switch in the Automatic position, the timing cycle begins. . . . . (1) Solenoid Valve #1 opens and Solenoid Valve #2 closes so that the balloon is inflated. After inflation the "BLUE" light is illuminated and the patient is thereby signalled to respond through the microphone for the TRIAL period (Step (2). (3) At the end of the TRIAL period the "BLUE" light is extinguished, which signals the patient to conclude his phonatory response. If a response has exceeded the preset (constant) threshold level and maintained this exceeded level for a selected time period (adjustable integrator, for example to 0 to 15 seconds) the result would be as follows: Illumination of the "GREEN" light (adjustable fixed ratio schedule), advance of both the 'correct' and the 'total' counters, Solenoid Valve #1 will close and Solenoid Valve #2 will open, deflating the balloon in the prosthesis. (A gain control permits operator regulation of the required intensity of the patient's voice to a challenging task level, with caution directed to remain within the respiratory-phonatory capabilities of the patient. Obviously the timing circuits parameters etcetera also have a bearing upon successfully completing such an effort as the patient's endurance will dictate limitation within temporal aspects of each cycle as well as the number of cycles).

CONTINUING:

If an adequate response fails to occur during the TRIAL cycle according to the preset criteria (voice level maintained above the set threshold for a given number of seconds) then the "RED" light is illuminated, the 'total' counter is advanced, Solenoid Valve #1 closes, Solenoid Valve #2 opens and the compressed air is vented, deflating the prosthesis. (4) The final or REST portion of the cycle provides physical rest for the patient whereby the deflation continues and all colored lights are extinguished until once again at the end of the inflation portion the "BLUE" light is illuminated and signals the beginning of a recycle to the patient. At the completion of a predetermined number of recorded total and/or successfully completed trials (combined pressure stimulation-phonation events) the selector is switched to "Standby", the prosthesis removed, and the unit is deactivated via opening the power switch.

What is claimed is:

1. Apparatus for conducting a palatal exercise in a patient using an inflatable oral prosthesis having means for controlling the inflation and deflation of said prosthesis, means responsive to said patient's voice manifestations during said exercise when said prosthesis is inflated, and monitoring means under control of said responsive means whereby said patient is enabled to regulate said manifestations by observation thereof.

2. The invention of claim 1 with the further provision of means for conforming said regulation to predetermined values.

3. The invention of claim 2 with the further provision of means for indicating whether or not said values are met.

* * * * *